United States Patent
Wishart et al.

(10) Patent No.: US 6,195,383 B1
(45) Date of Patent: Feb. 27, 2001

(54) DIGITAL SIGNAL PROCESSING APPARATUS FOR FREQUENCY DE-HOPPING

(75) Inventors: Alexander Walker Wishart, London; Peter John Kelly, Stevenage, both of (GB)

(73) Assignee: Matra Marconi Space UK Limited, Middlesex (GB)

( * ) Notice: Subject to any disclaimer, the term of this patent is extended or adjusted under 35 U.S.C. 154(b) by 0 days.

(21) Appl. No.: 09/449,480

(22) Filed: Nov. 29, 1999

(30) Foreign Application Priority Data

Nov. 28, 1998 (GB) .................................. 9826107

(51) Int. Cl.⁷ .............................. H04B 15/00; H04K 1/00; H04L 27/30
(52) U.S. Cl. ............................................. 375/136; 375/350
(58) Field of Search ..................... 375/136, 137, 375/133, 134, 350

(56) References Cited

U.S. PATENT DOCUMENTS 5,625,641 * 4/1997 Takakusaki .......................... 375/202

FOREIGN PATENT DOCUMENTS 2 319 708   5/1998 (GB) .

* cited by examiner

Primary Examiner—Chi H. Pham
Assistant Examiner—Phuong Phu
(74) Attorney, Agent, or Firm—Venable; Robert Kinberg

(57) ABSTRACT

A payload of a communications satellite includes several receive chains connected to respective antennas 1 to 4. Each receive chain 6 is hybrid in that analogue filtering is carried out at the front end in order to remove the unwanted input spectrum beyond that of a broadband within which a narrowband signal is frequency hopped. Thereafter the filtered signal is digitized and the hopping pattern removed by using successive segments of a control word which determines the hopping frequencies to successively select progressively narrower sub-bands which contain the wanted signal on each hop.

7 Claims, 8 Drawing Sheets

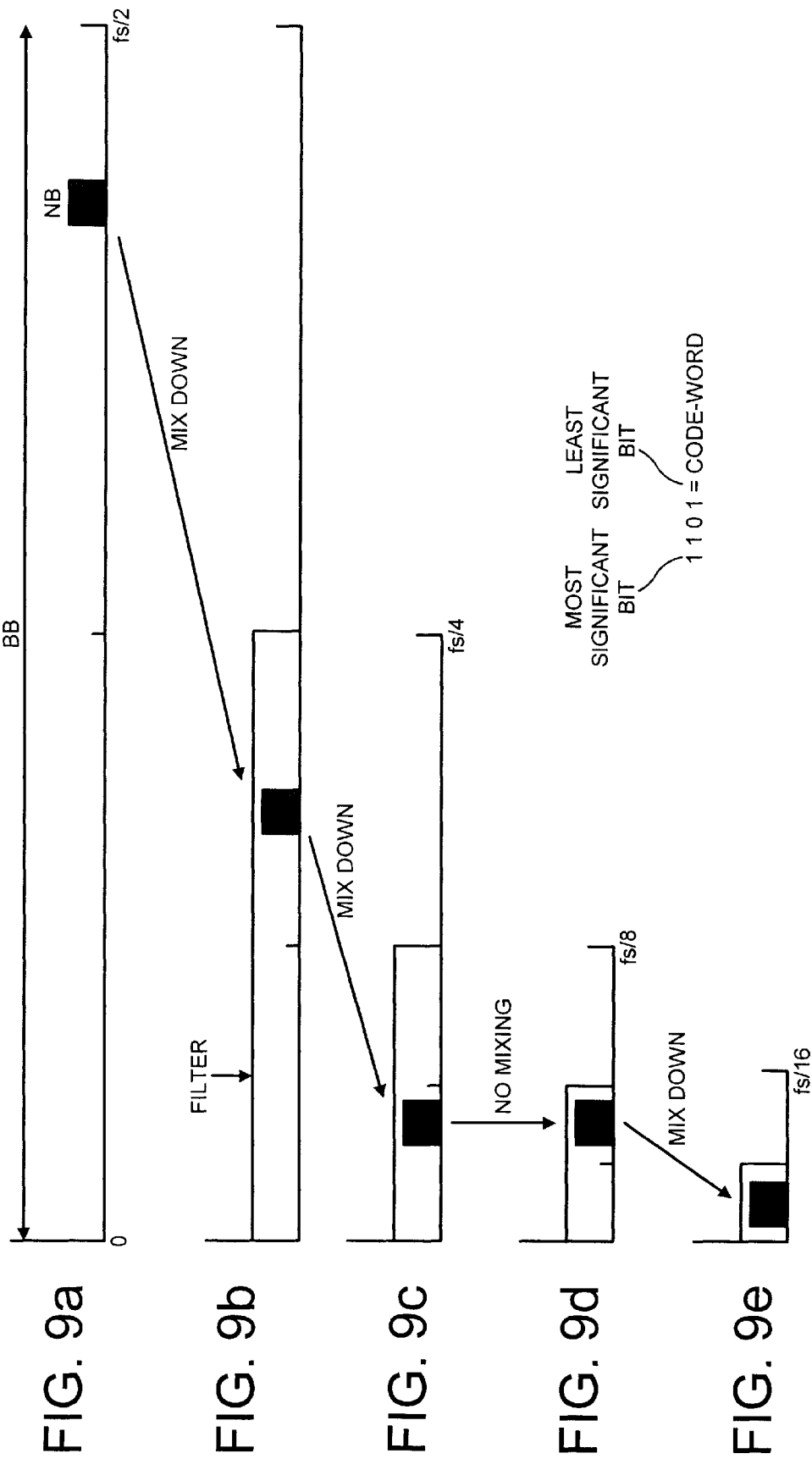

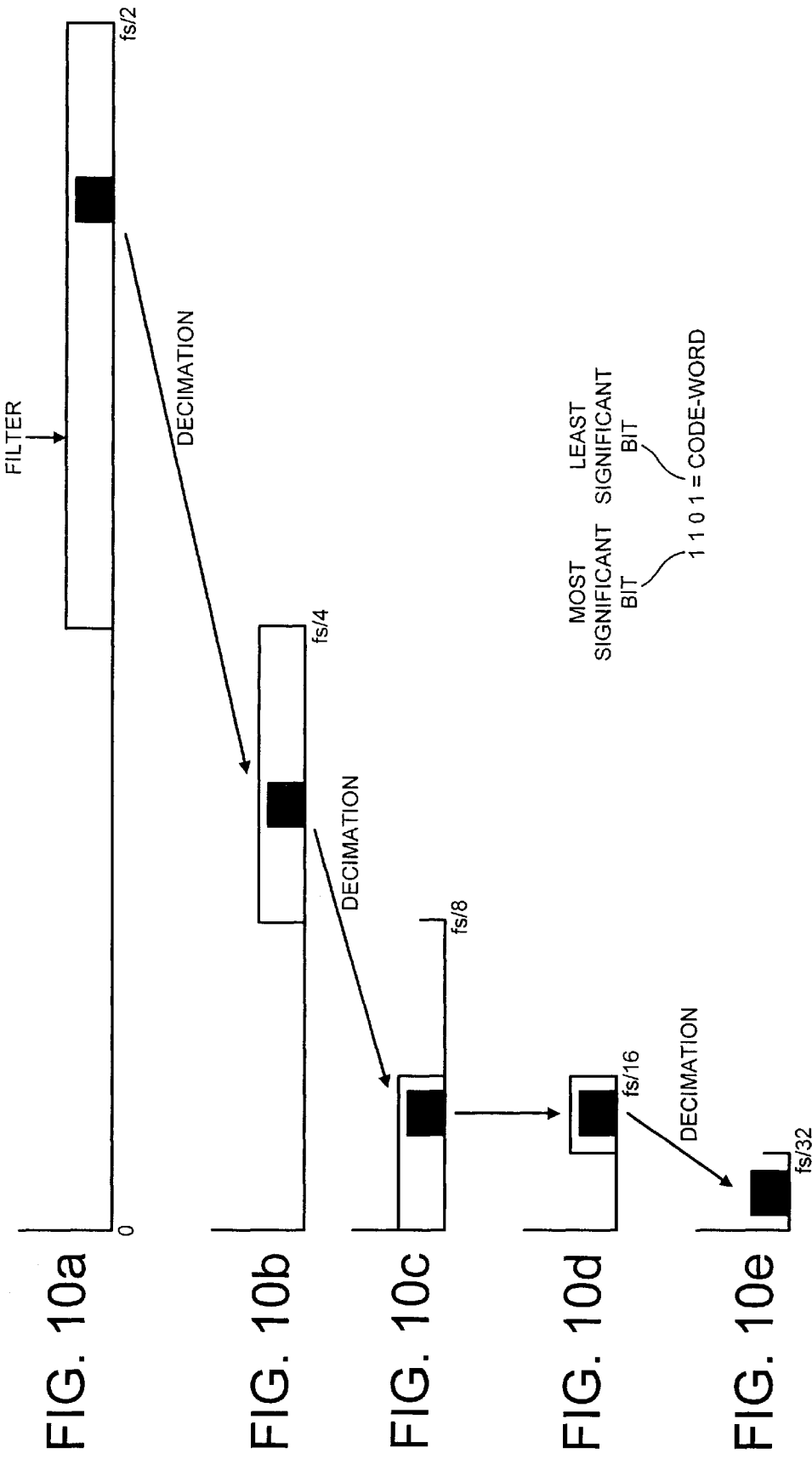

DIGITAL SIGNAL PROCESSING APPARATUS FOR FREQUENCY DE-HOPPING

This invention relates to digital signal processing apparatus.

The invention particularly relates to digital signal processing apparatus for frequency de-hopping narrowband received signals which have been transmitted on a carrier frequency which is bopped within a broadband range of frequencies. The invention especially relates to such digital signal processing apparatus for use on-board a communications satellite.

Current on-board processors use analogue signal processing apparatus for de-hopping the narrowband received signals. The de-hopped signal is demodulated, and then re-modulated and transmitted along a downlink. The on-board processor may be for communicating between different terminals which may be land, sea or air based, in a secure manner.

In the past, transparent on-board processors have been used, which do not demodulate the signal, but just amplify it and switch it to a desired downlink. However, any interfering signals would also be amplified and transmitted on the downlink.

One of the advantages of regenerative on-board processors is that this does not happen, because the received signal is demodulated, and the transmitted signal re-modulated, The current analogue regenerative on-board processors are based on analogue frequency synthesisers, which produce a local oscillator frequency which is mixed with a received r.f. signal and which varies in step with the hopped carrier frequency, in order to effect the de-hopping. The tone produced by the agile frequency synthesiser at each hop is determined by a control word generated for that hop by a generator in the satellite or on the ground. A similar generator in the transmitting terminal determines the hopping pattern of the carrier frequency.

Problems associated with this approach include the mass volume and complexity of the synthesiser, and the difficulties associated with distributing the synthesiser output to multiple receive chains.

It might be expected that these problems would be alleviated by using digital processing. However, even if an analogue-to-digital (A-D) converter fast enough to digitise the incoming r.f. received signal was available, an interfering signal could cause sufficient incoming power for the A-D converter to saturate and therefore distort the incoming signal, or even for the A-D converter to burn out.

This could be avoided by providing a hybrid arrangement, using an analogue filter at the front end, and digitising a consequently reduced bandwidth. Using this approach, the filtered digitised received signal would be mixed digitally with a digital representation of the tone at each hop. However, the multiplication of the complex values entailed in the mixing would still represent a heavy processing overload.

The invention provides digital signal processing apparatus for frequency de-hopping a narrowband received signal which has been transmitted on a carrier frequency which is hopped within a broadband range of frequencies according to respective control words, including means for sampling the broadband at a first sampling rate, and means for using successive segments of the control word to select progressively narrower sub-bands which contain the narrowband signal, in which sub-bands processing is arranged to be performed at a reduced sampling rate.

This avoids having to perform explicit mixing operations at the higher first sampling rate.

Ways of carrying out the invention will now be described in greater detail, by way of example, with reference to the accompanying drawings, in which:

FIGS. 9a to 9e show a typical frequency response for an architecture of the kind illustrated in FIG. 4 with four stages of filtering/mixing, each using one bit of code word; and FIGS. 10a to 10e show a typical frequency response for an architecture of the kind illustrated in FIG. 5 with four stages of filtering/decimation, each using one bit code word.

Figure 1:
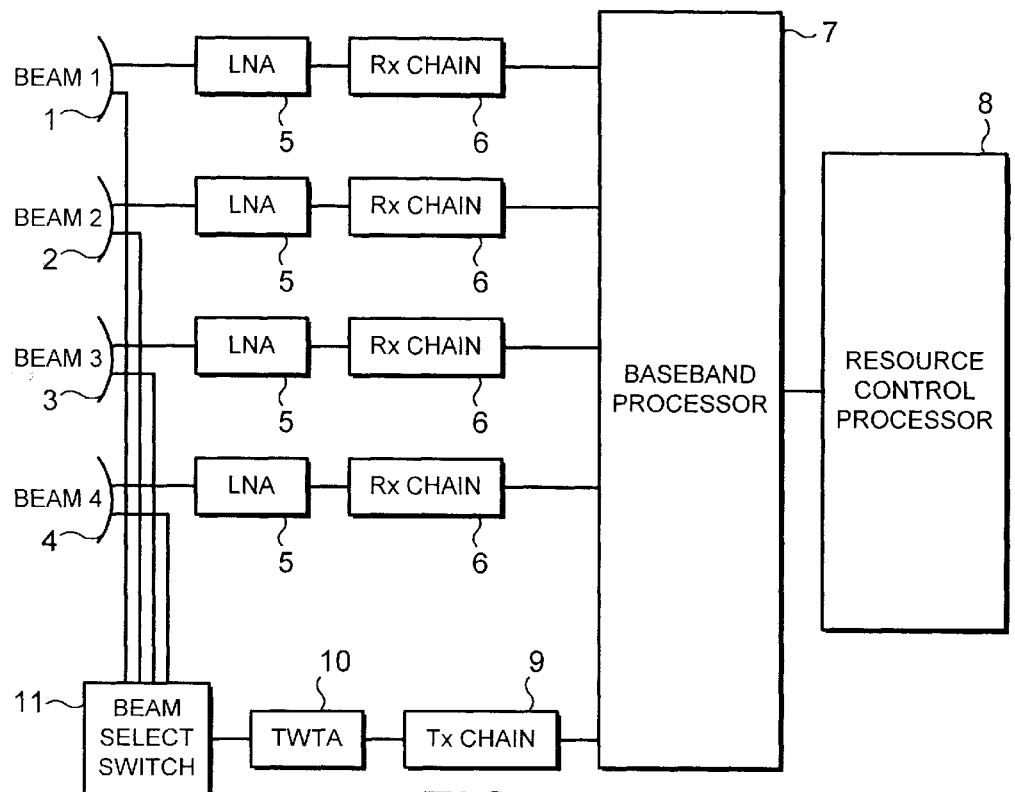
FIG. 1 is a block circuit diagram of the payload of a regenerative communications satellite according to the invention.

Referring to FIG. 1, the communications satellite provides a means of secure communication between terminals at sea, on land or in the air. The payload has a number of receivers, connected to antennas 1, 2, 3, 4 etc. aimed in different directions. Each receiver chain 6 is fed from the respective antenna via a low noise amplifier 5 etc. The input to the antenna is r.f., and the output of the receive chain is at baseband. Under the control of a resource controller processor 8, the baseband processor passes the processed received signals to a transmit chain 9, which modulates it onto a desired r.f. carrier frequency, whereupon it is amplified in travelling wave tube amplifier 10 and then switched by means of switch 11 to one of the antennas 1, 2, 3, 4 for transmission.

Typically, the uplinks will be low speed frequency division multiplexes, and the downlink will be a high speed time division multiplex of all the uplink data.

To ensure secure transmission, the narrowband uplink signal is transmitted on a carrier frequency which is periodically hopped within a broadband range of frequencies. A digital signal processing apparatus in each receive chain 6 etc. digitises the wideband input frequency band which contains the transmitted signal and removes the impressed hopping pattern. As part of this process, the processing means downconverts the signal to a complex baseband representation at a lower sampling rate, at which it is input to the baseband processor 7 which demodulates the received signal, to recover the originally transmitted data. Under the control of the resource control processor 8, a complex baseband representation of the downlink data is assembled in the baseband processor, and a complex baseband signal is fed to the transmit chain in which the signal is modulated on a carrier and a hopping pattern is impressed.

Figure 2:
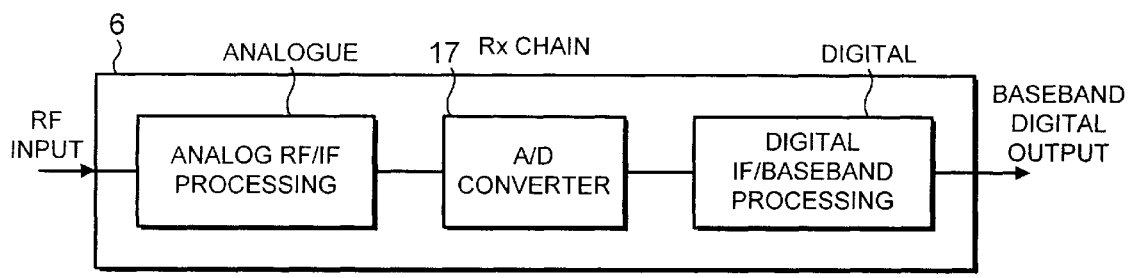
FIG. 2 is a schematic diagram of a hybrid receiver chain of the payload of FIG. 1.
Figure 3:
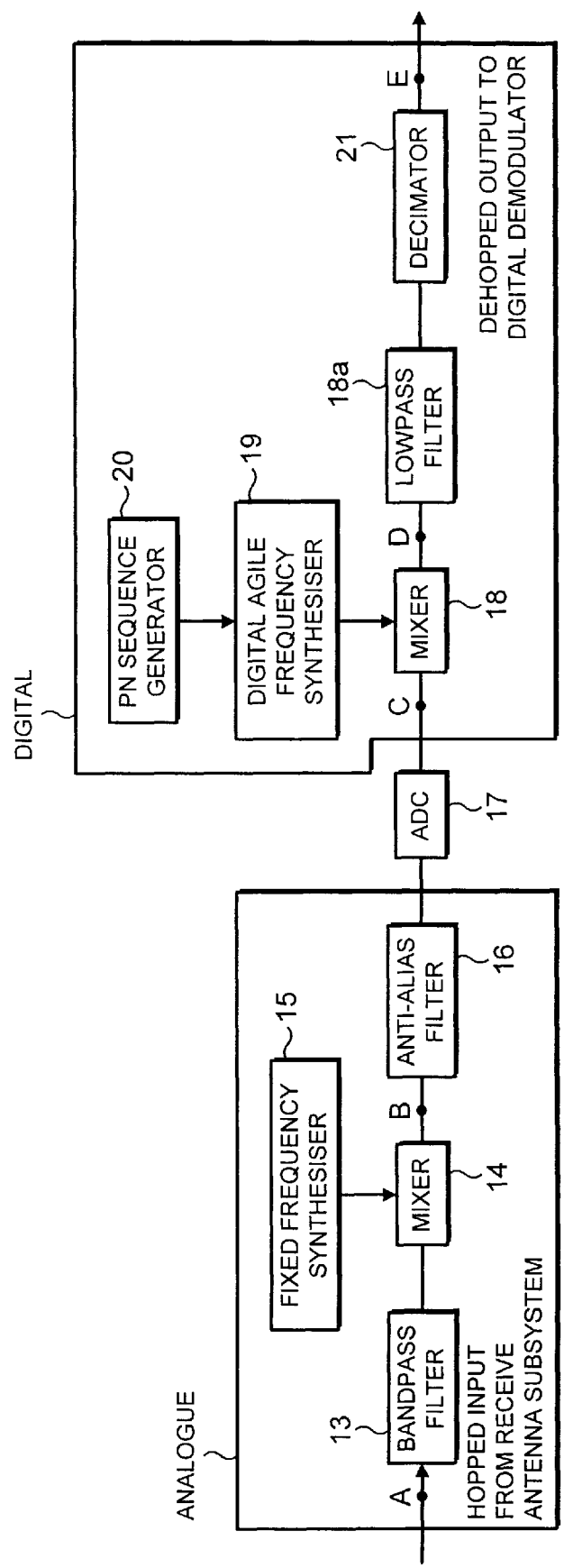
FIG. 3 is a block circuit diagram to illustrate the functions to be performed by the hybrid receiver chain of FIG. 2.
Figure 7A:
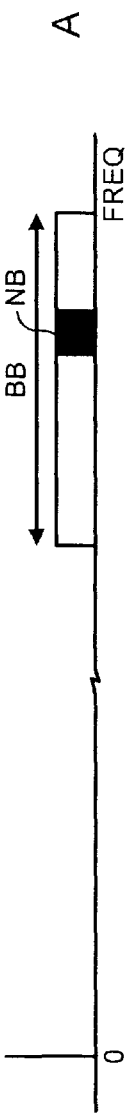
FIGS. 7a to 7e are frequency response diagrams at various points in the circuit of FIG. 3 to illustrate the downconversion of a typical r.f. received signal.
Figure 7B:
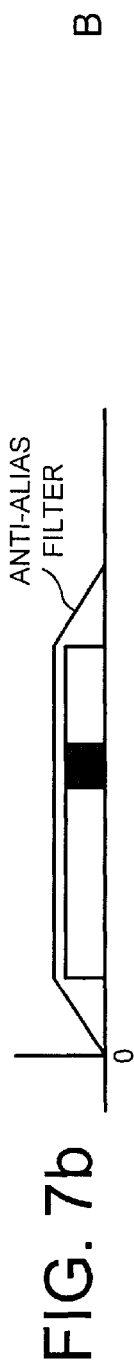
Figure 8:
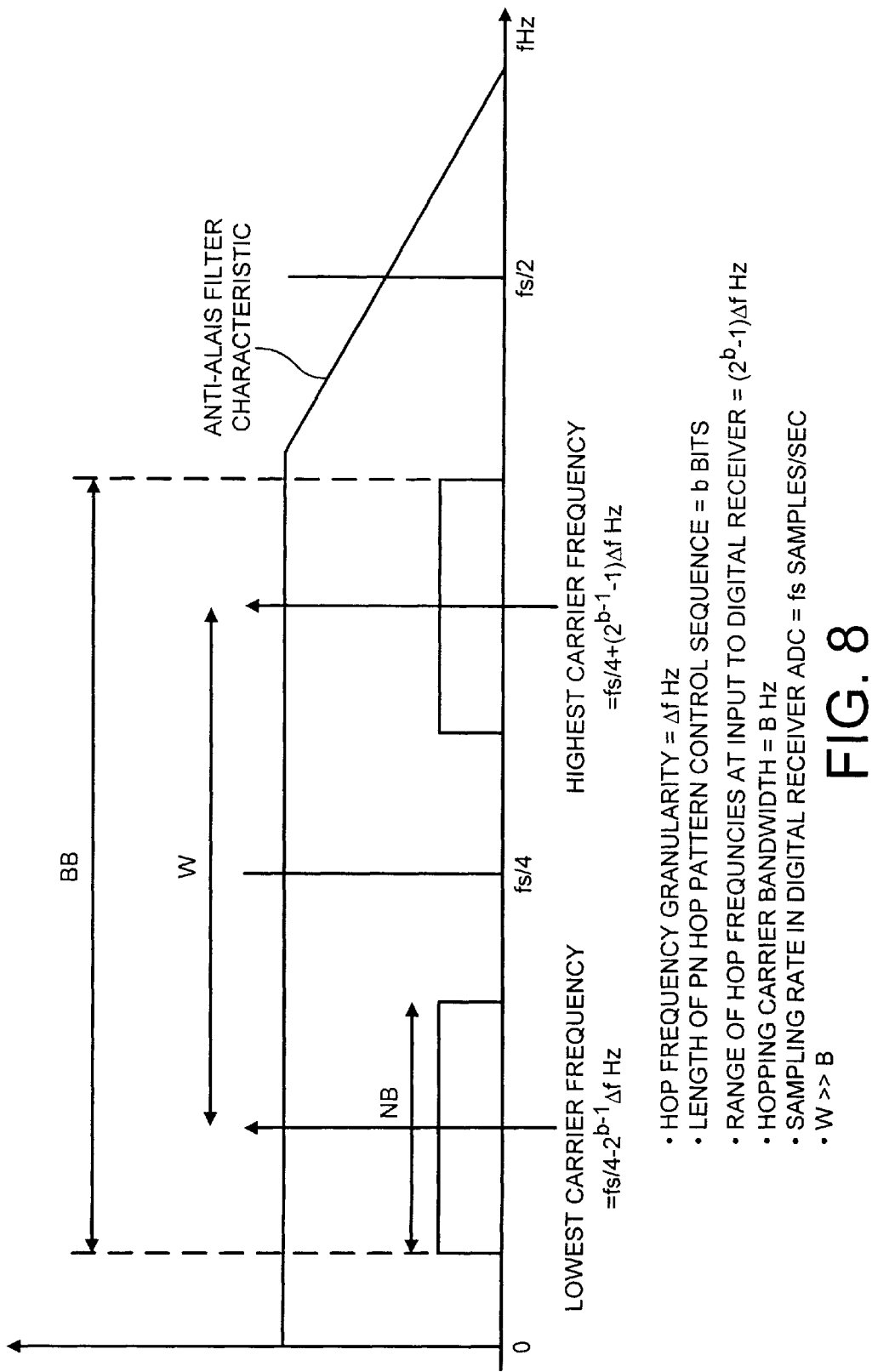
FIG. 8 shows the spectral characteristics of a signal in the anti-alias filter of FIG. 3.

Referring to FIGS. 2 and 3, each receive chain is a hybrid, in the sense that the incoming hopped r.f. signal undergoes analogue r.f./i.f. processing in the Analogue block followed by digital processing in the Digital block after analogue-to-digital converter 17. Thus, referring to FIG. 3, a bandpass filter 13 filters out everything outside the broadband range of frequencies (A) within which the carrier frequency is hopped. This band would be too high to digitise (FIG. 7a), and is therefore translated down to a low i.f. using mixer 14 and fixed frequency local oscillator 15 (B—see FIG. 7b). After anti-alias filter 16, the broadband range of frequencies is low enough to be digitised in analogue-to-digital converter 17. The spectral characteristics of the signal after the anti-alias filter 16 is shown in more detail in FIG. 8, where W represents the broadband range of frequencies within which the carrier frequency is hopped, BB the corresponding range in which the modulated signal can lie, and NB represents the narrowband received signal i.e. the bandwidth of the hopped carrier. The sampling frequency in the analogue-to-digital converter fs is at a little in excess of twice the highest frequency the modulated carrier can attain.

This downward translation assists against strong interfering signals which, even if suitably fast analogue-to-digital converters could be found which could operate on the untranslated broadband, could nevertheless be overloaded by those interfering signals.

In more detail, the hopping component $f_h$ given by $f_h = X\Delta f$ where X is the signed decimal equivalent of a b-bit 2's complement PN (pseudo-noise) sequence control word which is changed every hop period and $\Delta f$ is the hop frequency granularity. The range of hopping carrier frequencies is therefore $$W=[f_o-2^{b-1}\Delta f, f_o+(2^{b-1}-1)\Delta f]$$

and the total number of possible frequencies is $2^b$.

The signal processing functions of the digital signal processing apparatus are shown in FIG. 3. The ADC 17 defines the boundary between the analogue and digital signal processing domains. The fixed frequency synthesiser 15 is used to mix the uplink band of width W to a suitable intermediate frequency (IF) at the centre frequency of the width W, where it is filtered in the anti-alias filter prior to the ADC 17. Digitisation in the ADC 17 is at a rate fs~2W samples per second. See C and FIG. 7c.

Referring to FIG. 3, the functions to be performed by the digital signal processing apparatus are to convert the signal to baseband and reduce its sampling rate for input to the baseband processor 7 for digital demodulation.

Figure 7C:
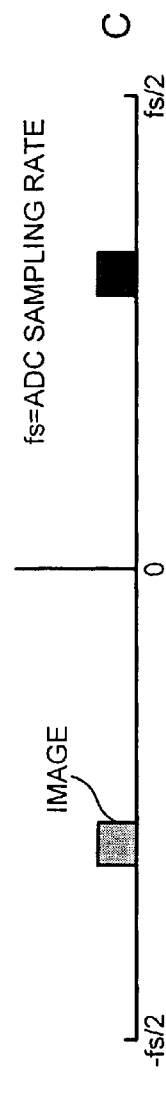
Figure 7D:
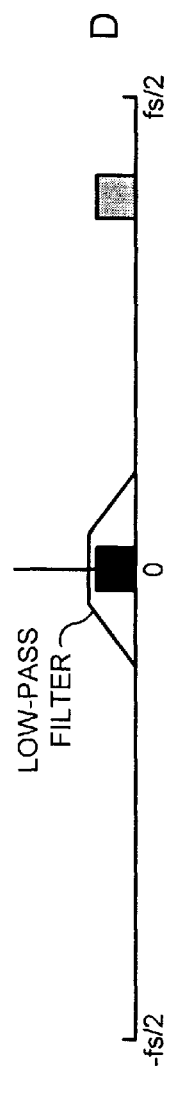
Figure 7E:
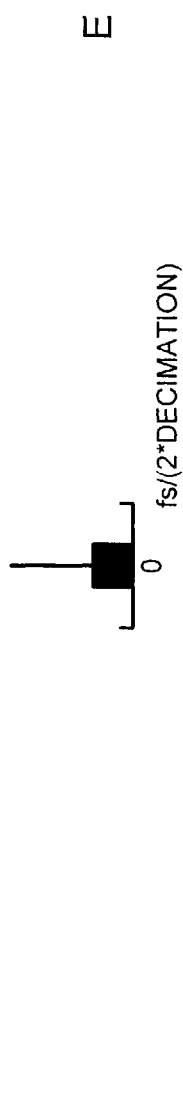

To do this, the digital signal processing apparatus de-hops the digitised broadband signal by combining it in mixer 18 with a local oscillator 19 which varies in step with the hopping pattern by virtue of PN (pseudo-random number) sequence generator 20 (D—FIG. 7d). The resulting signal passes through a low pass filter 18a and a decimator 21 (E—FIG. 7e).

In fact, FIG. 3 only shows the functions to be performed by the digital signal processing apparatus but the implementation does not use a digital agile frequency synthesiser and mixer 18 as such. In fact, the multiplication operation to be carried Out in mixer 18 of the complex numbers from the ADC 17 and the agile generator 19 could result in a very heavy processing overload on the digital signal processing apparatus, which would cause increased bulk and complexity. In fact, these functions are implemented as shown in FIG. 5.

It should first be mentioned that PN sequence generator 20 generates control words of binary digits which determine the carrier frequency at each hop. A 4-bit control word is shown schematically on FIGS. 9 and 10, but longer control words than this are possible.

Figure 4:
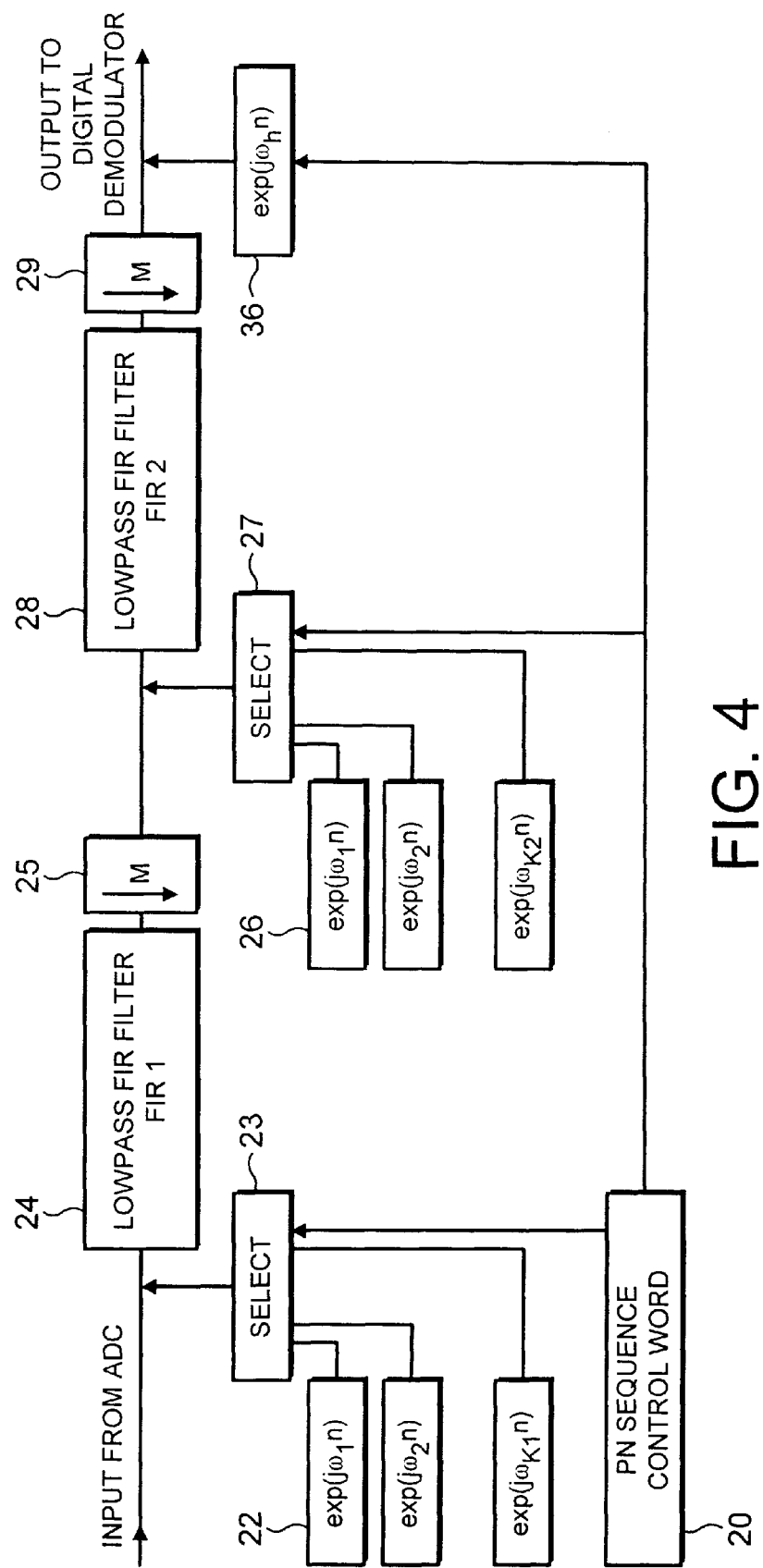
FIG. 4 is a block circuit diagram of an architecture to indicate the operational principle of digital signal processing apparatus which performs the functions illustrated in FIG. 3.
Figure 5:
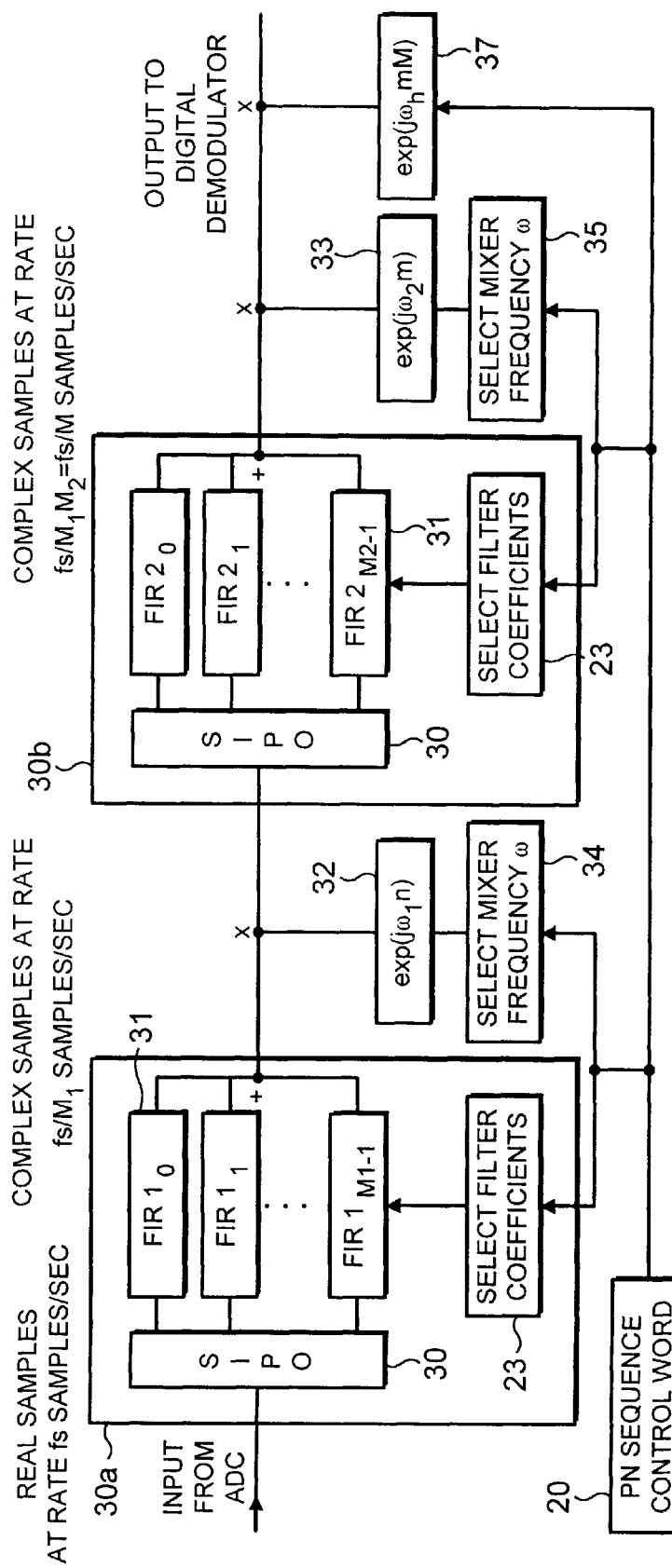
FIG. 5 is a block circuit diagrard of an architecture of digital signal processing apparatus realising the functions indicated by FIG. 3.

For ease of explanation, the principle of the way in which the digital signal processing apparatus is implemented is shown in FIGS. 4 and 9, and its actual implementation is shown in FIGS. 5 and 10.

Thus, at each hop what happens is that the most significant bit of the control word determines in which half of the broadband (BB) the received signal (NB) lies. Referring to FIG. 4, this would be equivalent to the input from the ADC 17 being multiplied by a complex exponential tone generator 22, selected by selector 23 dependent on the first bit of the control word from generator 20. Referring to FIG. 9a, if the most significant bit of the control word indicated that the narrowband was in the lower half of the broadband BB, no multiplication would be necessary, whereas if the most significant bit indicated that the narrowband NB was in the upper half of the broadband BB, then digital multiplication by a complex tone would be necessary to translate the upper half of the broadband BB to the lower half. In the present example, the most significant bit has value 1, indicating that the narrowband NB is in the upper half of the broadband BB. After digital multiplication takes place, the samples are passed through low pass FIR filter 24 to remove aliases, and the sampling rate is halved in decimator 25 to correspond to the narrower sub-band shown in FIG. 9b. The sampling rate is now fs/2.

During the same hop, the next most significant bit of the control word selects via selector 27 one of the complex exponedtial tones 26 to be mixed with the output of the decimator 25 in order to translate downwardly the narrowband containing the received narrowband signal NB if this should turn out to be the upper half of the narrower band shown in FIG. 10b. The next most significant bit of the control word has value 1, indicating that the narrowband signal is in the upper half of the sub-band of FIG. 9b, and this upper half is therefore translated to the lower half to create a smaller sub-band (FIG. 9c). Aliases are removed in low pass FIR filter 28 and the sampling rate is again halved in decimator 29 to fs/4.

The next most significant bit in FIG. 9 is zero, indicating that the narrowband is in the lower half of the sub-band of FIG. 9c. The architecture of FIG. 4 and for that matter FIG. 5 only show two filter/decimator stages, but the control word 1101 implies four such stages. Thus, a stage similar to the digital tone generators 22,26 would be necessary to perform any necessary digital multiplication (none is necessary with the value 0), and a low pass filter and decimator similar to 24,25, 28,29 would be required. The sampling rate would now be fS/8 (FIG. 9d).

The least significant bit of value 1 again indicates that the narrowband is in the upper half of the subband of FIG. 9d, and another set of digital tone generators, lowpass filters and decimators would be required to downtranslate the signal band and reduce the sampling rate to fs/16 (FIG. 9e).

This progressive selection of subbands all takes place on one dwell of the r.f. received signal. The procedure is repeated at the next dwell, etc.

The control word could consist of more or less bits than the four in the example given.

While the architecture shown in FIG. 4 would work, the invention is preferably realised by the computationally efficient architecture of FIG. 5, and with reference to FIGS. 10a to 10e. The tone generators, lowpass filters and decimators are replaced by bandpass FIR filters 30a, 30b etc. which have means 23 to select the filter coefficients and hence passband on each hop. The first filter decimator 30a selects the passband appropriate to the most significant bit of the first control word on any particular hop, the second filter decimator 30b selects the passband appropriate the next most significant bit of the control word on the same hop, etc.

Thus, assuming the same control word 1101 for one particular dwell, the most significant bit implies that the narrowband signal NB is in the upper half of the broadband BB—see FIG. 10a. (The digitised broadband BB extends over a frequency spectrum of from zero to half the sampling frequency fs). The filter 30a, which has programmable coefficients, generates a passband extending over the upper half of the broadband BB, and nulls the lower half. Given the reduced bandwidth, the filter/decimator 30a is clocked at a lower rate than that of the input samples, and the narrowband is therefore downtranslated into the nulled out region into the region shown in FIG. 10b. In this case the input samples are clocked at fs samples/second, and the filter/decimator 30a is clocked at fs/2 samples/second.

Figure 6:
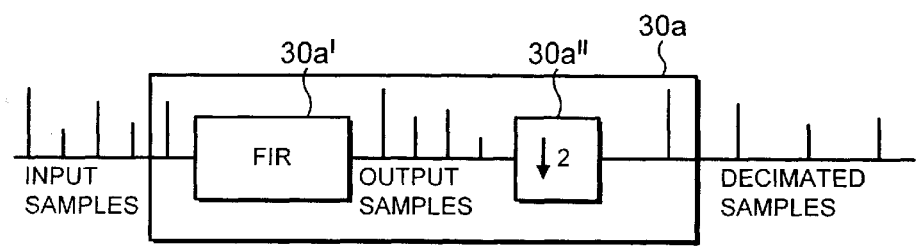
FIG. 6 is a schematic diagram illustrating the operation of a filter-decimator.

FIG. 6 shows one of the filter/decimators 30a, but the FIR filter 30a' and decimator 30a" would be different in FIG. 5 and are shown for the purposes of explanation only.

Input samples would be multiplied in FIR filter 30a' by weighted values of the impulse response to produce output samples. The reduced bandwidth would permit decimation in decimator 30a". This is a decimation factor of 2, which means that alternate output samples would be discarded. Consequently, the filter/decimator 30a of FIG. 5 is designed so that the filter is clocked at the decimated rate without the need for a separate decimator stage i.e. the samples which would be discarded are not calculated at all. This reduces the computation required to be performed.

Returning to FIG. 5 and FIG. 10b, the next most significant bit of the control word has value 1, again indicating that the narrowband signal is in the upper half of the subband of FIG. 10b. Filter/decimator 30b thus applies a passband corresponding the upper half of the subband, and nulls other regions. The clocking of this filter/decimator is also halved compared to its input sample rate, and is now clocked at fs/4. The narrowband is downtranslated to the region shown in FIG. 10c.

While not shown in FIG. 5, two further filter/decimator stages 30c, 30d, similar to 30a, 30b, would be needed for the four bit control word. Thus, the next most significant bit, 0, indicates that the narrowband is in the lower half of the subband of FIG. 10c, and an appropriate passband is generated, nulling out other regions. The rate of clocking of the FIR is again reduced by a factor of two to fs/8. The spectrum is as shown in FIG. 10d i.e. the narrowband has not been downtranslated.

The least significant bit, value 1, indicates that the narrowband is in the upper half of the subband of FIG. 10d, and a passband is generated over the upper half of the passband, nulling out other regions. The FIR is again clocked at half the rate for the previous stage, resulting in the narrowband being downtranslated to the region shown in FIG. 10e. The subband extends to fs/32, corresponding to a clocking rate of the samples at the output of filter/decimator 30d of fs/16.

Note that this process of progressive use of the successive bits of the control word takes place on each dwell of the received signal.

Of course, it is not necessary for the successively narrower sub-bands to be determined by successive bits of the control word. They could be determined by successive segments. Thus, the b-bits of the PN sequence control word could be partitioned into N segments of length $b_i$, where $$b = \sum_{i=0}^{N-1} b_i$$

The first stage of the de-hopping cascade would be controlled by the first pattern segment, containing the $b_0$ most significant bits (MSBs) of the hop pattern. This bit pattern defines which of the set of $2^{b0}$ complex exponential tone sequences should be used to mix (multiply) the input signal. The output of the digital mixer would be filtered in the lowpass finite impulse response (FIR) filter 24 and the sampling rate reduced by a factor $M_1$. This process would be repeated for the second stage, in which the sampling rate would be reduced by a further factor $M_2$. The choice of the number of stages, the stage filter bandwidth, and the stage decimation factor, depend on the characteristics of the particular system and would be optimised as part of the implementation design.

For example, the bits of the control word could be taken in pairs, and the broadband could be divided at each stage into quarters. The sampling rate would be reduced by a factor of four at each filter/decimator 30a etc. Nor is it necessary for the same degree of decimation to be applied at each stage. One stage, controlled by two bits of the control word, could decimate by a factor of four, another stage, controlled by a single bit of the control word, could decimate by a factor of two.

It could happen that the narrowband spanned both halves of a subband after downward translation. To avoid complications of filtering, an offset could be applied to the subband using digital tone generators 32,33. The need for such an offset could be indicated by the control word controlling respective selectors 34,35.

If desired, the broadband BB representing the input stream of digital samples from the ADC 17 could itself be a fraction of a broader band representing the analogue signal (FIG. 3 and B in FIG. 7b). Thus, the PN sequence generator 20 of FIG. 5 could also control one or more analogue filter stages preceding ADC 17 in FIG. 3. The most significant bit of the control word could control analogue filters to select a subband of the broader band, and the next most significant bit could be likewise. Of course, the identification of such subbands would not then have any advantage in terns of digital signal processing, This would only apply to the digitised broadband at the output of ADC 17, controlled by the remaining bits of the control word.

In another modification, the least significant bit (or $b_{N-1}$ least significant bits) could act as a final correction factor, causing a complex tone generator 36 (FIG. 4), 37 (FIG. 5) to apply a final offset to remove the residual bopping pattern. This could also be done within the baseband processor 7 (FIG. 1).

Referring to FIG. 5, the filter/decimators 30a etc. could be implemented using computationally efficient polyphase structures in which all arithmetic operations are performed at the decimated sampling rate. The filters are bandpass designs, with programmable complex coefficients which are selected on a hop by hop basis, i.e. different coefficients for all the filter/decimator stages in turn will be chosen at each hop to a different received frequency. The technique can be generated to an arbitrary number of stages.

Thus, the filter/decimator 30a could consist of a serial to parallel converter 30, followed by a number of identical FIR filter processing branches 31. The same coefficients are chosen for the filters in each branch on each hop. There could be for example four branches in the filter/decimator 30a. Each would be clocked at a rate of fs/4. The samples would be added at the output of the branches. This could correspond to use of a pair of bits which indicate in which quarter of the digitised broadband the narrowband signal lies.

The invention is suitable for received signals over a wide range of communication frequencies, for example, in the GHz region, such as Ka band (27 GHZ–40 GHZ).

The hopping may be periodic, but the invention is also applicable to a tunable receiver which retunes a periodically e.g. to avoid interference such as from ground communications. The invention is applicable to all such arrangements, provided that the narrowband forms a fraction of the spectrum of the broadband, such as less than 10% of the latter, preferably less than 1% of the latter.

The payload described above is a regenerative payload, in that the carrier is demodulated in baseband processor 7 and then remodulated. However, the invention is also applicable to a transparent dehopped rehopped payload, in which uplink carriers are dehopped then rehopped onto downlinks without carrier demodulation and remodulation.

What is claimed is:

1. Digital signal processing apparatus for frequency de-hopping a narrowband received signal which has been transmitted on a carrier frequency which is hopped within a broadband range of frequencies according to respective control words, including means for sampling the broadband at a first sampling rate, and means responsive to at least two successive segments of the control word to select progressively narrower sub-bands which contain the narrowband signal, the sub-bands being processed at progressively reduced sampling rates.

2. A payload of a communications satellite including digital signal processing apparatus as claimed in claim 1.

3. A communications satellite having a payload as claimed in claim 2.

4. Digital signal processing apparatus for frequency de-hopping a narrowband received signal which has been transmitted on a carrier frequency which is hopped within a broadband range of frequencies according to respective control words, including means for sampling the broadband at a first sampling rate, and means responsive to at least two successive segments of the control word to select progressively narrower sub-bands which contain the narrowband signal, in which sub-bands processing is arranged to be performed at a reduced sampling rate, the sub-band selection means comprising a plurality of digital filters arranged in cascade, the filter coefficients of which are selected by successive segments of the control word.

5. Digital signal processing apparatus as claimed in claim 4, in which the digital filters are finite impulse response (FIR) filters.

6. Digital signal processing apparatus as claimed in claim 5, in which at least one digital FIR filter comprises a serial to parallel converter and FIR filters in each parallel branch.

7. Digital signal processing apparatus as claimed in claim 6, in which the digital FIR filter is a polyphase filter.

* * * * *